United States Patent
Yao et al.

(10) Patent No.: US 8,913,614 B2
(45) Date of Patent: Dec. 16, 2014

(54) METHOD, SYSTEM AND ACCESS SERVICE ROUTER FOR IMPLEMENTING MULTICAST SERVICE

(75) Inventors: Chunbo Yao, Shenzhen (CN); Bing Huang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 51 days.

(21) Appl. No.: 13/395,685

(22) PCT Filed: Aug. 20, 2010

(86) PCT No.: PCT/CN2010/076211
§ 371 (c)(1),
(2), (4) Date: Mar. 13, 2012

(87) PCT Pub. No.: WO2011/032451
PCT Pub. Date: Mar. 24, 2011

(65) Prior Publication Data
US 2012/0177040 A1   Jul. 12, 2012

(30) Foreign Application Priority Data
Sep. 16, 2009  (CN) .......................... 2009 1 0171893

(51) Int. Cl.
| | | |
|---|---|---|
| H04L 12/28 | (2006.01) | |
| H04L 12/18 | (2006.01) | |
| H04L 29/12 | (2006.01) | |
| H04L 12/761 | (2013.01) | |

(52) U.S. Cl.
CPC .......... H04L 12/185 (2013.01); H04L 61/2521 (2013.01); H04L 45/16 (2013.01)
USPC ....................................................... 370/390

(58) Field of Classification Search
CPC ....... H04L 45/16; H04L 12/185; H04L 12/18; H04L 12/1868; H04L 2001/0093; H04L 45/28; H04L 65/4076; H04L 12/1863; H04L 45/22; H04L 45/586; H04L 45/48; H04L 45/50; H04L 47/10; H04L 47/15; H04L 49/70; H04L 61/10; H04L 43/0811; H04L 45/00; H04L 45/02; H04L 45/58; H04L 47/12; H04L 61/6059; H04W 28/10; H04W 36/026
See application file for complete search history.

(56) References Cited

U.S. PATENT DOCUMENTS

| | | |
|---|---|---|
| 6,741,575 B1 | 5/2004 | Zhang et al. |
| 2003/0231629 A1* | 12/2003 | Banerjee et al. .............. 370/390 |

(Continued)

FOREIGN PATENT DOCUMENTS

| | | |
|---|---|---|
| CN | 101222414 A | 7/2008 |
| CN | 101483600 A | 7/2009 |

(Continued)

OTHER PUBLICATIONS

International Search Report for PCT/CN2010/076211, English translation attached to original, Both Completed by the Chinese Patent Office on Nov. 4, 2010, All together 8 Pages.

(Continued)

*Primary Examiner* — Chi H Pham
*Assistant Examiner* — Raul Rivas
(74) *Attorney, Agent, or Firm* — Brooks Kushman P.C.

(57) ABSTRACT

A method for implementing multicast service is disclosed, comprising: a multicast source sending a multicast service packet of which a destination address is configured to be a Group Access Identity (GAID) assigned to the multicast source; an Access Service Router (ASR) to which the multicast source belongs searching for a corresponding Group Router Identity (GRID) in the established GAID-GRID mapping table according to the GAID, and sending the multicast service packet to a General Switch Router (GSR); the GSR searching for a corresponding multicast tree according to the GRID of the multicast service packet, and sending the multicast service packet to the ASR in the service area; the ASR in the service area searching for a corresponding GAID in the established GAID-GRID mapping table according to the GRID, and sending the multicast service packet to the terminal under the ASR in the service area.

14 Claims, 3 Drawing Sheets

(56) References Cited

U.S. PATENT DOCUMENTS

| | | | |
|---|---|---|---|
| 2006/0045036 A1 | 3/2006 | Isobe et al. | |
| 2006/0114904 A1* | 6/2006 | Lee | 370/390 |
| 2006/0159050 A1 | 7/2006 | Kim et al. | |
| 2006/0203750 A1* | 9/2006 | Ravikumar et al. | 370/261 |
| 2009/0059923 A1* | 3/2009 | Guo et al. | 370/390 |

FOREIGN PATENT DOCUMENTS

| | | |
|---|---|---|
| CN | 101631274 A | 1/2010 |
| JP | 2002538690 A | 11/2002 |
| JP | 2006074379 | 3/2006 |
| KR | 20080050282 A | 6/2008 |

OTHER PUBLICATIONS

Extended European Search Report for PCT/CN2010/076211, Completed by the European Patent Office, Dated Dec. 12, 2013, 14 Pages.

Farinacci et al. Network Working Group cisco Systems Jul. 27, 2009, 63 Pages, "Locator/ID Separation Protocol (LISP) draft-ietf-lisp-03.txt.".

Farinacci et al. Network Working Group cisco Systems May 28, 2009, 33 Pages, "LISP for Multicast Environments draft-ietf-lisp-multicast-01.txt.".

* cited by examiner

METHOD, SYSTEM AND ACCESS SERVICE ROUTER FOR IMPLEMENTING MULTICAST SERVICE

CROSS-REFERENCE TO RELATED APPLICATION

This application is the U.S. national phase of PCT Appln. No. PCT/CN02010/076211 filed Aug. 20, 2010 which claims priority to Chinese Application No. 200910171893.5 filed Sep. 16, 2009, the disclosures of which are incorporated in their entirety by reference herein.

TECHNICAL FIELD

The present invention relates to the filed of network interconnection technique, and more especially, to a method, system and Access Service Router (ASR) for implementing multicast service.

BACKGROUND OF THE RELATED ART

At present, IP address of the Transmission Control Protocol/Internet Protocol (TCP/IP) widely used in the Internet has dual functions, which serves both as a location and an identification of the network interface of the network layer communication terminal in the network topology. The design of TCP/IP doesn't consider the situation of a terminal mobility at the beginning, however, when the terminal mobility is gradually common, the defect of semanteme overload of the existing IP address becomes increasingly apparent. When the IP address of the terminal changes, not only the route changes, but also the identification of the terminal changes, which will cause the routing load to be more and more heavy, and the change of the identification will lead to an interruption of the application and connection.

To solve the problems of the semanteme overload of IP address and severe routing load, people propose an idea of separating the identification and location, to separate the dual functions of the IP address, thereby providing supports for mobility, multiple home, IP address dynamic relocation, reducing routing load and exchange visits between different network areas in the next generation Internet.

FIG. 1 is a kind of Location Identification Separation Network (LISN), the LISN keeps advantages of the IP network, such as a point to point connection is adopted between an edge router, i.e. the Access Service Router (ASR), and terminal; terminals under the same ASR are isolated mutually and can only interconnect through the ASR; a user needs to pass an identity authentication to access the ASR; the ASR performs authentication of the source address on the data packet of in the uplink of the terminal, etc.

The LISN implements the separation of identification and location of the terminal through the following mechanism.

The IP address of the ASR in which the terminal is located is taken as the location of the terminal, which is called as a Router ID (RID), the RID adopts 128-bit coding in the IPv6 and adopts 32-bit coding in the IPv4. The identification of the terminal is introduced and the identification is called as an Access ID (AID), and the AID adopts 128-bit coding.

In the LISN, the terminal only perceives its own AID and the AID of the opposite communication terminal, but doesn't perceive RID information. All the upper connections are established based on the AID, that is, the TCP/AID and User Datagram Protocol (UDP)/AID are adopted to replace the TCP/IP and UDP/IP in the existing network.

A mapping server is also introduced into the LISN, which is used to keep the AID-RID mapping information of the terminal. When the terminal moves, only the AID-RID mapping information of the terminal is needed to be updated, and the AID is not necessary to be changed, thus the terminal mobility will not influence the connection of the service.

Multicast is a network communication method that a single sender corresponds to multiple receivers, the multicast technique can reduce the communication flows of the network when multiple receiving parties simultaneously acquire or query the same resources by sending single information flow to multiple receiving parties. LISN is a kind of brand new network architecture, and the prior art has no method for implementing multicast service in the LISN yet.

SUMMARY OF THE INVENTION

The technical problem to be solved by the present invention is to provide a method and a system for implementing multicast service to implement multicast service in the location identification separation network such as LISN and so on.

In order to solve the above technical problem, a method for implementing multicast service of the present invention comprises:

a multicast source sending a multicast service packet of which a destination address is configured to be a Group Access Identity (GAID) assigned to the multicast source;

an Access Service Router (ASR) to which the multicast source belongs searching for a corresponding Group Router Identity (GRID) in an established GAID-GRID mapping table according to the GAID after receiving the multicast service packet, and sending the multicast service packet to a General Switch Router (GSR) by adopting the found GRID;

the General Switch Router (GSR) searching for a corresponding multicast tree according to the GRID of the multicast service packet, and sending the multicast service packet to the ASR in the service area according to the multicast tree; and the ASR in the service area searching for a corresponding GAID in the established GAID-GRID mapping table according to the GRID, and sending the multicast service packet to a terminal under the ASR in the service area by adopting the found GAID.

Before sending the multicast service packet, the multicast source applies for the GAID and the GRID and requests an identification location register (ILR) for performing authentication after obtaining the GRID;

if the authentication succeeds, the ILR sends the GAID and the GRID of the multicast source to the ASR in the service area; and the ASR in the service area establishes the GAID-GRID mapping table after receiving the GAID and the GRID.

The ASR in the service area further broadcasts the GAID to terminals under the ASR in the service area after receiving the GAID and the GRID;

the terminal under the ASR in the service area determins whether to receive a multicast service identified by the GAID according to the received GAID, if yes, request the ASR to which the terminal belongs to open the multicast service;

the ASR in the service area requests an upper layer GSR for joining in a service group of the multicast service identified by the GAID according to the request of the terminal; and the GSR adds a route reaching to the ASR which sends out the request into the multicast tree according to the request of the ASR.

The ILR is configured with a binding relationship of the GAID and the GRID assigned to the multicast source and the AID of the multicast source;

the step of the authentication comprises:

the multicast source sending a multicast control packet to the ASR to which the multicast source belongs, and the ASR sending the GAID and/or an AID of the multicast source to the ILR; and the ILR querying the binding relationship according to the received GAID and/or the AID, if the GRID of the multicast source is obtained, the authentication succeeding.

The step of sending the multicast service packet to the GSR by adopting the found GRID comprises: the ASR to which the multicast source belongs replacing the GAID of the multicast service packet with the found GRID, and sending the replaced multicast service packet to the GSR;

the step of sending the multicast service packet to terminals under the ASR in the service area by adopting the found GAID comprises: the ASR in the service area replacing the GRID of the multicast service packet with the found GAID, and sending the replaced multicast service packet to the terminals under the ASR in the service area.

The step of sending the multicast service packets to the GSR by adopting the found GRID comprises: the ASR to which the multicast source belongs encapsulating the found GRID into the multicast service packet, and sending the encapsulated multicast service packet to the GSR;

the step of sending the multicast service packet to terminals under the ASR in the service area by adopting the found GAID comprises: the ASR in the service area replacing the GRID with the found GAID, removing the original GAID encapsulated in the multicast service packet, and sending the multicast service packet to the terminals under the ASR in the service area.

The terminal judging whether the multicast service packet belongs to the multicast service which is requested according to the GAID of the received multicast service packet, if yes, de-encapsulating the multicast service packet and obtaining service data; otherwise, discarding the multicast service packet.

The step of sending the multicast service packet to the GSR by adopting the found GRID further comprises:

when sending the multicast service packet, the multicast source further configuring the source address of the multicast service packet to be an AID of the multicast source; and when replacing the GAD of the multicast service packet with the found GRID, the ASR to which the multicast source belongs further replacing the AID of the multicast service packet with a RID found from the established AID-RID mapping table;

the step of sending the multicast service packet to terminals under the ASR in the service area by adopting the found GAID further comprises: when replacing the GRID of the multicast service packet with the found GAID, the ASR in the service area further replacing the RID of the multicast service packet with the AID found from the established AID-RID mapping table.

The step of sending the multicast service packet to the GSR by adopting the found GRID further comprises: when sending the multicast service packet, the multicast source further configuring the source address of the multicast service packet to be the AID of the multicast source; and when encapsulating the found GRID into the multicast service packet, the ASR to which the multicast source belongs further encapsulating the RID searched out from the saved AID-RID mapping table into the multicast service packet;

the step of sending the multicast service packet to terminals under the ASR in the service area by adopting the found GAD further comprises: when the ASR in the service area replacing the GRID with the found GAID and removing the original GAD encapsulated in the multicast service packet, the ASR in the service area further removing the packaged RID.

A system for implementing multicast service, wherein, the system comprises a multicast source, an Access Service Router (ASR) to which the multicast source belongs, a General Switch Router (GSR) and an ASR in a service area, wherein:

the multicast source is configured to: send a multicast service packet of which a destination address is configured to be a Group Access Identity (GAID) assigned to the multicast source;

the ASR to which the multicast source belongs is configured to: search for a corresponding GRID in an established GAID-Group Router Identity (GRID) mapping table according to the GAID after receiving the multicast service packet, and send the multicast service packet to the General Switch Router (GSR) by adopting the found GRID;

the General Switch Router (GSR) is configured to: search for a corresponding multicast tree according to the GRID of the multicast service packet, and send the multicast service packet to the ASR in the service area according to the multicast tree;

the ASR in the service area is configured to: search for a corresponding GAID in the established GAID-GRID mapping table according to the GRID, and send the multicast service packet to a terminal under the ASR in the service area by adopting the found GAID.

The system further comprises an identification location register (ILR), wherein, the multicast source is further configured to: before sending the multicast service packet, apply for the GAID and the GRID and request the ILR for performing authentication after obtaining the GRID;

the ILR is configured to: perform authentication on the multicast source according to the request of the multicast source, and send the GAID and the GRID of the multicast source to the ASR in the service area if the authentication succeeds;

the ASR in the service area is further configured to: establish the GAID-GRID mapping table after receiving the GAID and the GRID.

The ASR to which the multicast source belongs is configured to: send the multicast service packet to the General Switch Router (GSR) by adopting the found GRID in the following way: replacing the GAID of the multicast service packet with the found GRID, and sending the replaced multicast service packet to the GSR;

the ASR in the service area is configured to: send the multicast service packet to terminals under the ASR in the service area by adopting the found GAID in the following way: replacing the GRID of the multicast service packet with the found GAID, and sending the replaced multicast service packet to the terminals under the ASR in the service area.

The ASR to which the multicast source belongs is further configured to: send the multicast service packet to the General Switch Router (GSR) by adopting the found GRID in the following way: encapsulating the found GRID into the multicast service packet, and sending the encapsulated multicast service packet to the GSR;

the ASR in the service area is further configured to: send the multicast service packet to terminals under the ASR in the service area by adopting the found GAID in the following way: replacing the GRID with the found GAID, removing the original GAID encapsulated in the multicast service packet, and sending the multicast service packet to terminals under the ASR in the service area.

The invention further provides an Access Service Router (ASR), wherein, the ASR is an ASR to which the multicast source belongs, or the ASR is an ASR in the service area.

The ASR to which the multicast source belongs is configured to: search for a corresponding Group Router Identity (GRID) in an established GAID-Group Router Identity (GRID) mapping table according to the Group Access Identity (GAID) after receiving a multicast service packet, and send the multicast service packet to a General Switch Router (GSR) by adopting the found GRID, which makes the GSR search for a corresponding multicast tree according to the GRID of the multicast service packet and send the multicast service packet to the ASR in the service area according to the multicast tree; wherein, the multicast service packet is sent to the ASR to which the multicast source belongs by the multicast source, and a destination address of the multicast service packet is configured to be an assigned GAID;

the ASR in the service area is configured to: search for a corresponding GAID in the established GAID-GRID mapping table according to the GRID, and send the multicast service packet to a terminal under the ASR in the service area by adopting the found GAID.

The ASR in the service area is further configured to: establish the GAID-GRID mapping table after receiving the GAD and the GRID.

The ASR to which the multicast source belongs is configured to: send the multicast service packet to the GSR by adopting the found GRID in the following way: replacing the GAID of the multicast service packet with the found GRID, and sending the replaced multicast service packet to the GSR;

the ASR in the service area is configured to: send the multicast service packet to the terminal under the ASR in the service area by adopting the found GAD in the following way: replacing the GRID of the multicast service packet with the found GAID, and sending the replaced multicast service packet to the terminal under the ASR in the service area.

The ASR to which the multicast source belongs is further configured to: send the multicast service packet to the GSR by adopting the found GRID in the following way: encapsulating the found GRID into the multicast service packet, and sending the encapsulated multicast service packet to the GSR;

the ASR in the service area is further configured to: send the multicast service packet to the terminal under the ASR in the service area by adopting the found GAID in the following way: replacing the GRID with the found GAID, removing the original GAID encapsulated in the multicast service packet, and sending the multicast service packet to the terminal under the ASR in the service area.

In conclusion, the present invention identifies the multicast service packet between the ASR and terminals by using the GAID, and uses the GRID to identify the multicast service packet in the core network, thereby implementing multicast service in the location identification separation network such as LISN and so on; the present invention doesn't need to change the terminals and can be compatible with the existing IPv4 network and IPv6 network.

PREFERRED EMBODIMENTS OF THE PRESENT INVENTION

The present invention defines two kind of multicast addresses, namely the Group Access Identity (GAID) and Group Router Identity (GRID), wherein, the GAD is used to identify multicast stream between the terminals and the ASR, the action range of the GAID is equal to the action range of the AID, and adopts 128-bit coding. The GRID is used to identify the multicast stream in the core network, the action range of the GRID is equal to the action range of the RID, and adopts 128-bit coding in the IPv6 and 32-bit coding in the IPv4.

The GRID can adopt the unused addresses in the multicast address space of the IPv4 or IPv6. The GAID can adopt the unused addresses in the multicast address space of the IPv6. To simplify the design, the GRID and GAID can be made to adopt the same address of the same space.

The method for implementing multicast service according to the present invention will be described in detail below with reference to drawings.

Figure 1:
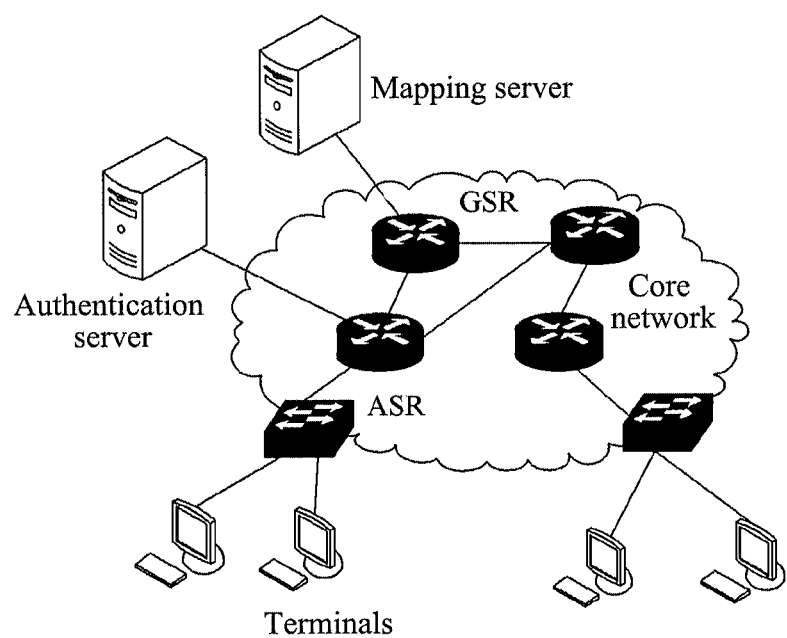
FIG. 1 is an architecture diagram of the LISN according to the prior art.
Figure 2:
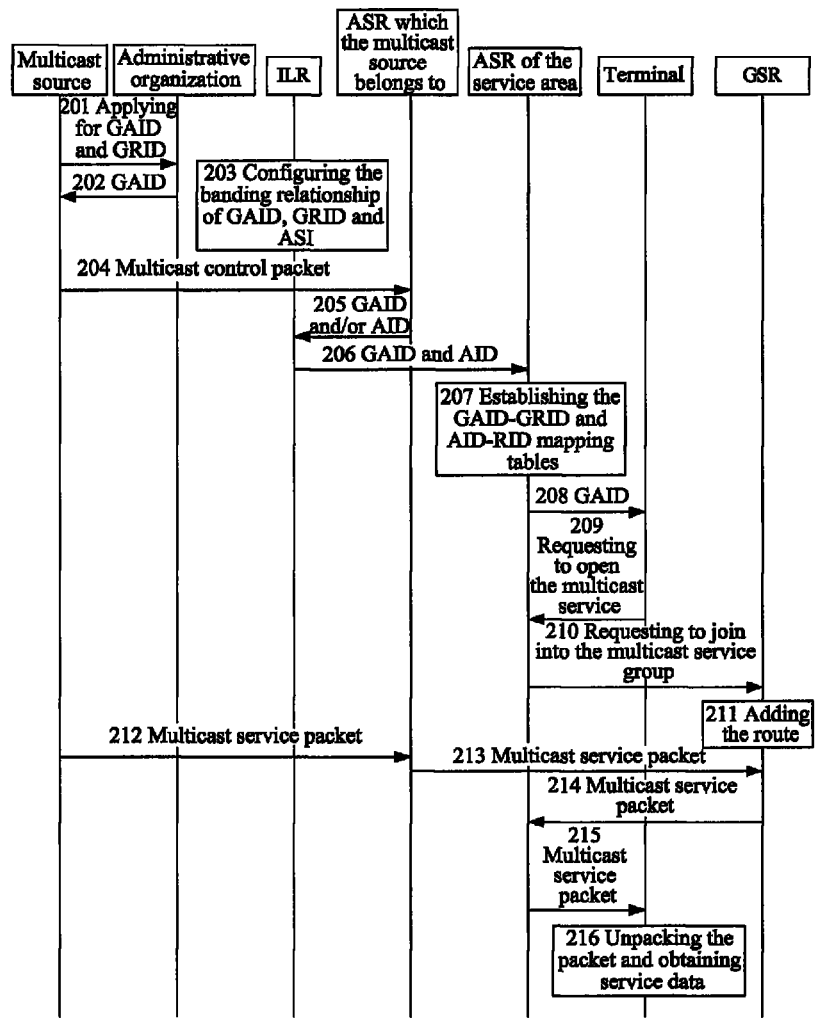
FIG. 2 is a flow chart of the method for implementing multicast service according to the present invention.

FIG. 2 is the method for implementing multicast service according to the present invention, which comprises the following steps.

201. The user of multicast source applies to an administrative organization or an address server in the network for the GAID and the GRID.

202. The administrative organization or address server assigns the GAID and GRID to the multicast source, and sends the GAD to the multicast source;

the GAID and GRID assigned to the multicast source by the administrative organization or address server need to be unique in the LISN network.

The reason for sending only the GAID to the multicast source is that the GRID is used to identify the multicast stream in the core network, and the multicast source will know the transmission information of the core network if the GRID is sent to the multicast source, which will cause risk to the network security.

203. The administrative organization performs binding of the GAID and GRID assigned to the multicast source with the AID of the multicast source in the Identity Location Register (ILR).

204. The multicast source sends a multicast control packet to the ASR to which the multicast source belongs to request for performing authentification.

205. The ASR to which the multicast source belongs receives the multicast control packet, and then sends the GAID and/or AID of the multicast source to the ILR through the upper General Switch Router (GSR) of the ASR to which the multicast source belongs.

206. The ILR queries the binding relationship according to the received GAID and/or AID, if the GRID of the multicast source is obtained, the authentification succeeds, and the ILR sends the GAID and GRID of the multicast source to the ASR in the service area.

207. The ASR in the service area receives the GAID and GRID of the multicast source, then establishes the mapping table between the GAID and the GRID (GAID-GRID mapping table), and also establishes the mapping table between the AID and RID of itself (AID-RID mapping table), the ASR to which the multicast source belongs informs the multicast source that the authentification succeeds.

208. The ASR in the service area broadcasts the GAID to the terminals in the administrative areas of the ASR in the service area.

209. A terminal determines whether to receive the multicast service according to the received GAID, if yes, the terminal sends a notification message to the ASR to which the terminals belong to request for opening the multicast service.

In the service operation, multicast services represented by different GAIDs need to be issued, the user can learn the multicast service represented by the received GAD through a query to determine whether to receive the multicast service.

The ASR adopts an Internet Group Management Protocol (IGMP) to broadcast periodically the GAD to terminals under the ASR.

To avoid a broadcast storm, the ASR needs to support the layer 2 multicast protocols, such as IGMP Proxy and IGMP Snooping, etc.

210. The ASR sends a notification message to the GSR of the upper layer the ASR to request for joining in the multicast service group after receiving the notification message of the terminal under the ASR.

211. The GSR adds a route reaching to the ASR which sends the notification message into the multicast tree;

after sending the GAD and if not receiving the notification message of the terminals, the ASR requests the GSR of the upper layer of the ASR to delete the route of the ASR in the multicast tree.

212. The multicast source sends the multicast service packets, wherein, the destination address is the GAID assigned to the multicast source, the source address is the AID of the multicast source itself, and the format is: GAD:AID:DATA.

213. After the multicast service packets reach to the ASR to which the multicast source belongs, the ASR replaces the GAID of the multicast service packets with the GRID and replaces the AID with the RID according to the locally stored GAID-GRID mapping table and AID-RID mapping table, the format is: GRID:RID:DATA, and the ASR sends the multicast service packets to the core network.

214. The General Switch Router (GSR) in the network searches for the corresponding multicast tree according to the GRID of the multicast service packets, and sends multicast service packets to the ASR in the service area according to the multicast tree;

the LISN adopts a Protocol Independent Multicast (PIM) protocol to be the multicast routing protocol. The ASR and General Switch Router (GSR) are responsible for the establishment and maintenance of the multicast routing PIM.

215. The ASR receiving the multicast service packets replaces the GRID with the GAD and replaces the RID with the AID according to the locally stored GRID-GAID mapping table and AID-RID mapping table, the format is: GAID:AID:DATA, and the ASR sends the multicast service packets to the terminals under the ASR; the RID of the multicast source is carried in the multicast service packets to aim at searching out the actual sender of the multicast service packets in the multisource multicast service.

216. The terminals judge whether the multicast service packets belong to the multicast service which the terminals request for according to the received GAID of the multicast service packets, if yes, the terminals unpack the multicast service packets and obtain the service data; otherwise, the terminals discard the multicast service packets.

In the above example, the steps 212~214 adopt a way of address substitution to forward the multicast service packets, and also can forward the multicast service packets in a secondary encapsulation, and the following steps are comprised.

a: The multicast source sends the multicast service packets, wherein, the destination address is GAID assigned to the multicast source, the source address is the AID of the multicast source itself, and the format is: GAID:AID:DATA.

b: After the multicast service packets reach to the ASR to which the multicast source belongs, the ASR searches for the GRID corresponding to the GAD and the RID corresponding to the AID according to the locally stored GAD-GRID mapping table and AID-RID mapping table, and forms into an IPinIP packet, the format is: GRID:RID:GAD:AID:DATA, and the ASR sends the multicast service packets to the network.

c: The GSR in the network searches for the corresponding multicast tree according to the GRID of the multicast service packets, and sends multicast service packets to the ASR in the service area according to the multicast tree.

d: The ASR receiving the multicast service packets replaces the GRID with the found GAID according to the locally stored GRID-GAID mapping table, and removes the RID and original GAID, the format of the multicast service packets turns into: GAID:AID:DATA, and the ASR sends the multicast service packets to the terminals under the ASR.

Figure 3:
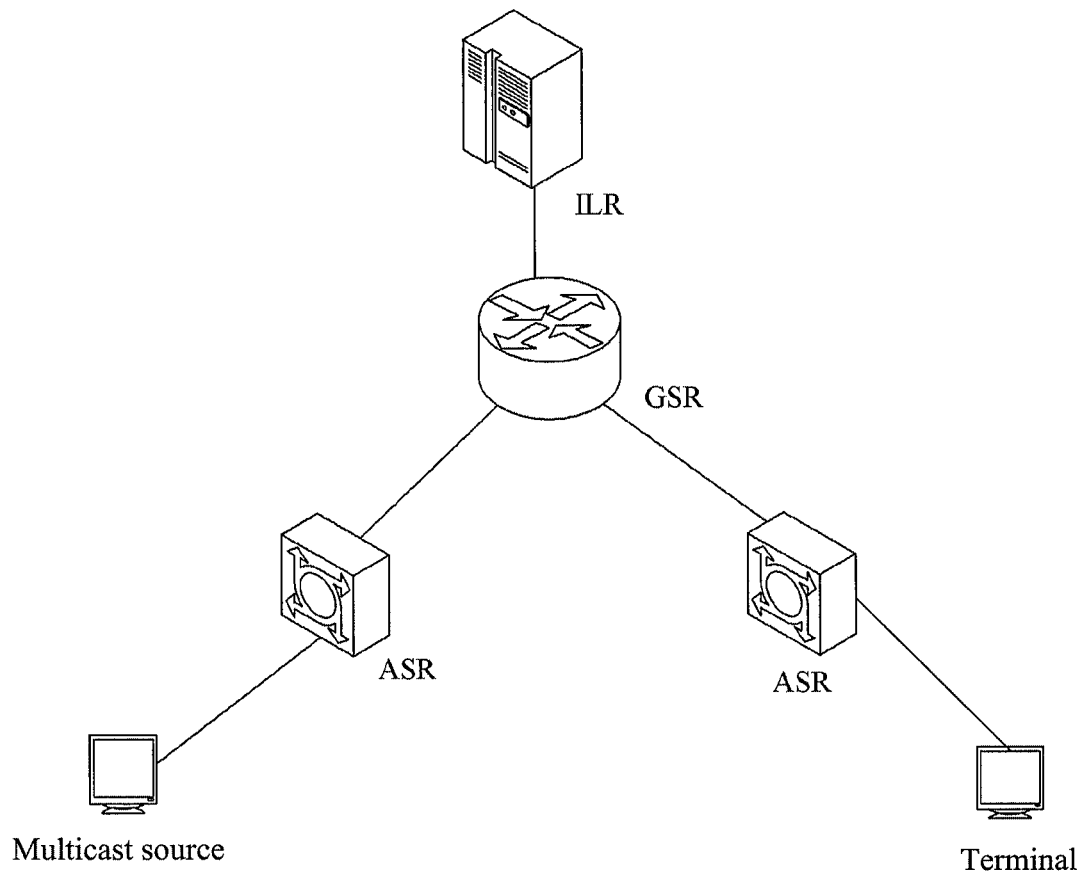
FIG. 3 is an architecture diagram of the system for implementing multicast service according to the present invention.

FIG. 3 illustrates the system for implementing multicast service according to the present invention, which comprises: a multicast source, an ASR to which the multicast source belongs, a General Switch Router (GSR), an ASR in the service area and an ILR, wherein:

the multicast source is used to: apply for the GAD and GRID before sending the multicast service packet, and request the ILR for performing authentication after obtaining the GRID; and is further used to: send the multicast service packet, and configure the destination address of the multicast service packet to be the Group Access Identity (GAID) assigned to the multicast source;

the ASR to which the multicast source belongs is used to: search for the corresponding GRID in the established GAID-Group Router Identity (GRID) mapping table according to the GAID after receiving the multicast service packet, and send the multicast service packet to the General Switch Router (GSR) by adopting the found GRID. The process of sending the multicast service packet to the GSR by adopting the found GRID comprises: replacing the GAD of the multicast service packet with the found GRID, and sending the replaced multicast service packet to the GSR; or encapsulating the found GRID into the multicast service packet, and sending the encapsulated multicast service packet to the GSR;

the GSR is used to: search for the corresponding multicast tree according to the GRID of the multicast service packet, and send the multicast service packet to the ASR in the service area according to the multicast tree;

the ASR in the service area is further used to: establish the GAID-GRID mapping table after receiving the GAID and the GRID, and is further used to: search for the corresponding GAID in the established GAID-GRID mapping table according to the GRID, and send the multicast service packet to the terminal under the ASR in the service area by adopting the found GAID. The process of sending the multicast service packet to the terminal under the ASR in the service area by adopting the found GAID comprises: replacing the GRID of the multicast service packet with the found GAID, and sending the replaced multicast service packet to the terminal under the ASR in the service area; or replacing the GRID with the found GAID, removing the original GAID encapsulated in the multicast service packet, and sending the multicast service packet to the terminal.

The ILR is used to: perform authentication on the multicast source according to the request of the multicast source, and send the GAID and the GRID of the multicast source to the ASR in the service area if the authentication succeeds.

Other related functions of the network devices in the system may be known with reference to the description of the content of the method.

The above content is just the optimal embodiments of the present invention, which is not used to limit the specific implementing way of the present invention. All the modifications and changes made according to the main inventive concept of the method shall fall into the protection scope claimed by the claims of the present invention.

INDUSTRIAL APPLICABILITY

The present invention identifies the multicast service packet between the ASR and terminals by using the GAD, and uses the GRID to identify the multicast service packet in the core network, thereby implementing multicast service in the location identification separation network such as LISN and so on; the present invention doesn't need to change the terminals and can be compatible with the existing IPv4 network and IPv6 network.

What is claimed is:

1. A method for implementing multicast service, comprising:
   a multicast source sending a multicast service packet of which a destination address is configured to be a Group Access Identity (GAID) assigned to the multicast source;
   searching by an Access Service Router (ASR) to which the multicast source belongs for a corresponding Group Router Identity (GRID) in an established GAID-GRID mapping table according to the GAID after the ASR receiving the multicast service packet, and sending the multicast service packet to a General Switch Router (GSR) by adopting the found GRID;
   the GSR searching for a corresponding multicast tree according to the GRID of the multicast service packet, and sending the multicast service packet to the ASR in the service area according to the multicast tree; and
   the ASR in the service area searching for a corresponding GAID in the established GAID-GRID mapping table according to the GRID, and sending the multicast service packet to a terminal under the ASR in the service area by adopting the found GAID;
   wherein the method for implementing multicast service is applied to the Location Identification Separation Network, the GAID is used to identify multicast stream between the terminal and the ASR, the GRID is used to identify the multicast stream in a core network.

2. The method according to claim 1, the method further comprising:
   before the multicast source sending the multicast service packet, the multicast source applying for the GAID and the GRID and requesting an identification location register (ILR) for performing authentication after obtaining the GRID;
   if the authentication succeeds, the ILR sending the GAID and the GRID of the multicast source to the ASR in the service area; and
   the ASR in the service area establishing the GAID-GRID mapping table after receiving the GAID and the GRID.

3. The method according to claim 2, the method further comprising:
   the ASR in the service area further broadcasting the GAID to terminals under the ASR in the service area after receiving the GAID and the GRID;
   the terminal under the ASR in the service area determining whether to receive a multicast service identified by the GAID according to the received GAID, if yes, requesting the ASR to which the terminal belongs to open the multicast service;
   the ASR in the service area requesting an upper layer GSR for joining in a service group of the multicast service identified by the GAID according to the request of the terminal; and
   the GSR adding a route reaching to the ASR which sends out the request into the multicast tree according to the request of the ASR.

4. The method according to claim 2, wherein,
   the ILR is configured with a binding relationship of the GAID and the GRID assigned to the multicast source and the AID of the multicast source;
   the step of the authentication comprises:
   the multicast source sending a multicast control packet to the ASR to which the multicast source belongs, and the ASR sending the GAID and/or an AID of the multicast source to the ILR; and
   the ILR querying the binding relationship according to the received GAID and/or the AID, if the GRID of the multicast source is obtained, the authentication succeeding.

5. The method according to claim 3, wherein,
   the step of sending the multicast service packet to the GSR by adopting the found GRID comprises: the ASR to which the multicast source belongs replacing the GAID of the multicast service packet with the found GRID, and sending the replaced multicast service packet to the GSR;
   the step of sending the multicast service packet to terminals under the ASR in the service area by adopting the found GAID comprises: the ASR in the service area replacing the GRID of the multicast service packet with the found GAID, and sending the replaced multicast service packet to the terminals under the ASR in the service area.

6. The method according to claim 3, wherein,
   the step of sending the multicast service packets to the GSR by adopting the found GRID comprises: the ASR to which the multicast source belongs encapsulating the found GRID into the multicast service packet, and sending the encapsulated multicast service packet to the GSR;
   the step of sending the multicast service packet to terminals under the ASR in the service area by adopting the found GAID comprises: the ASR in the service area replacing the GRID with the found GAID, removing the original GAID encapsulated in the multicast service packet, and sending the multicast service packet to the terminals under the ASR in the service area.

7. The method according to claim 5, the method further comprising:
   the terminal judging whether the multicast service packet belongs to the multicast service which is requested according to the GAID of the received multicast service packet, if yes, de-encapsulating the multicast service packet and obtaining service data; otherwise, discarding the multicast service packet.

8. The method according to claim 5, wherein, the step of sending the multicast service packet to the GSR by adopting the found GRID further comprises:

when sending the multicast service packet, the multicast source further configuring the source address of the multicast service packet to be an AID of the multicast source; and when replacing the GAID of the multicast service packet with the found GRID, the ASR to which the multicast source belongs further replacing the AID of the multicast service packet with a RID found from the established AID-RID mapping table;

the step of sending the multicast service packet to terminals under the ASR in the service area by adopting the found GAID further comprises: when replacing the GRID of the multicast service packet with the found GAID, the ASR in the service area further replacing the RID of the multicast service packet with the AID found from the established AID-RID mapping table.

9. The method according to claim 6, wherein, the step of sending the multicast service packet to the GSR by adopting the found GRID further comprises: when sending the multicast service packet, the multicast source further configuring the source address of the multicast service packet to be the AID of the multicast source; and when encapsulating the found GRID into the multicast service packet, the ASR to which the multicast source belongs further encapsulating the RID searched out from the saved AID-RID mapping table into the multicast service packet;

the step of sending the multicast service packet to terminals under the ASR in the service area by adopting the found GAID further comprises: when the ASR in the service area replaces the GRID with the found GAID and removes the original GAID encapsulated in the multicast service packet, the ASR in the service area further removing the packaged RID.

10. A system for implementing multicast service, the system comprising a multicast source, an Access Service Router (ASR) to which the multicast source belongs, a General Switch Router (GSR) and an ASR in a service area, wherein:

the multicast source is configured to: send a multicast service packet of which a destination address is configured to be a Group Access Identity (GAID) assigned to the multicast source;

the ASR to which the multicast source belongs is configured to: search for a corresponding GRID in an established GAID-Group Router Identity (GRID) mapping table according to the GAID after receiving the multicast service packet, and send the multicast service packet to the GSR by adopting the found GRID;

the GSR is configured to: search for a corresponding multicast tree according to the GRID of the multicast service packet, and send the multicast service packet to the ASR in the service area according to the multicast tree;

the ASR in the service area is configured to: search for a corresponding GAID in the established GAID-GRID mapping table according to the GRID, and send the multicast service packet to a terminal under the ASR in the service area by adopting the found GAID;

wherein the system for implementing multicast service is applied to the Location Identification Separation Network, the GAID is used to identify multicast stream between the terminal and the ASR, the GRID is used to identify the multicast stream in a core network.

11. The system according to claim 10, the system further comprising an identification location register (ILR), wherein, the multicast source is further configured to: before sending the multicast service packet, apply for the GAID and the GRID and request the ILR for performing authentication after obtaining the GRID;

the ILR is configured to: perform authentication on the multicast source according to the request of the multicast source, and send the GAID and the GRID of the multicast source to the ASR in the service area if the authentication succeeds;

the ASR in the service area is further configured to: establish the GAID-GRID mapping table after receiving the GAID and the GRID.

12. The system according to claim 10, wherein, the ASR to which the multicast source belongs is configured to: send the multicast service packet to the GSR by adopting the found GRID in the following way: replacing the GAID of the multicast service packet with the found GRID, and sending the replaced multicast service packet to the GSR;

the ASR in the service area is configured to: send the multicast service packet to terminals under the ASR in the service area by adopting the found GAID in the following way: replacing the GRID of the multicast service packet with the found GAID, and sending the replaced multicast service packet to the terminals under the ASR in the service area.

13. The system according to claim 10, wherein, the ASR to which the multicast source belongs is further configured to: send the multicast service packet to the GSR by adopting the found GRID in the following way: encapsulating the found GRID into the multicast service packet, and sending the encapsulated multicast service packet to the GSR;

the ASR in the service area is further configured to: send the multicast service packet to terminals under the ASR in the service area by adopting the found GAID in the following way: replacing the GRID with the found GAID, removing the original GAID encapsulated in the multicast service packet, and sending the multicast service packet to terminals under the ASR in the service area.

14. The method according to claim 6, the method further comprising:

the terminal judging whether the multicast service packet belongs to the multicast service which is requested according to the GAID of the received multicast service packet, if yes, de-encapsulating the multicast service packet and obtaining service data; otherwise, discarding the multicast service packet.

* * * * *